United States Patent [19]

Himmler

[11] Patent Number: 5,027,649

[45] Date of Patent: Jul. 2, 1991

[54] PROCESS AND APPARATUS FOR TESTING THE UNIFORMITY OF PNEUMATIC TIRES

[75] Inventor: Günther Himmler, Darmstadt, Fed. Rep. of Germany

[73] Assignee: Gebr. Hofmann GmbH & Co. KG, Pfungstadt, Fed. Rep. of Germany

[21] Appl. No.: 521,423

[22] Filed: May 10, 1990

[30] Foreign Application Priority Data

Jul. 6, 1989 [DE] Fed. Rep. of Germany ....... 3922288

[51] Int. Cl.$^5$ .......................................... G01M 17/02
[52] U.S. Cl. ..................................................... 73/146
[58] Field of Search .......................................... 73/146

[56] References Cited

FOREIGN PATENT DOCUMENTS 0141532 9/1982 Japan ..................................... 73/146

OTHER PUBLICATIONS

Einfluss der Kraftfahrzeugrader auf Das Fahrverhalten, Messtechnische Erfassung und Korrektur, L. Kramer, K. P. Ohms, 1970.
Hofmann Report 89, Automatische Reifengleichformigkeits-Messanlage fur PKW-Und LLKW-Reifen TYP RGM-E.

Primary Examiner—Donald O. Woodiel
Attorney, Agent, or Firm—Cushman, Darby & Cushman

[57] ABSTRACT

In a process and an apparatus for testing the uniformity of pneumatic tires, a fluctuation in radial force is measured and subtracted therefrom is a correction value derived from individual rotational truth profiles in respect of the testing drum, in radial planes which are normal to the axis of the drum.

11 Claims, 6 Drawing Sheets

PROCESS AND APPARATUS FOR TESTING THE UNIFORMITY OF PNEUMATIC TIRES

BACKGROUND OF THE INVENTION

With the increasing levels of performance of motor vehicles, a factor which is becoming more and more relevant in that respect is the question of uniformity of the tires used on such vehicles. A process for testing the uniformity of pneumatic tires and more particularly vehicle tires which provides that in a first measuring run a pneumatic tire which is mounted on a rim is rolled with a given radial loading against a testing drum, the radial force fluctuations which occur in that rolling operation are measured and corresponding measurement signals are produced, and evaluation of the measurement signals obtained during the measuring run results in values corresponding to the fluctuations in radial force, is to be found for example in 'Werkstatt und Betrieb', 1970, issue 3, pages 183 to 188, in the article by Kramer and Ohms 'Einfluss der Kraftfahrzeugrader auf das Fahverhalten' [Influence of motor vehicle wheels on handling characteristics]. Thus, considerable importance is to be attached to the vehicle wheel and in particular the tire thereon, in regard to the handling characteristics of motor vehicles.

Various criteria are applied for the purposes of evaluating uniformity of a tire. In that respect, consideration is given in particular to the spring or resiliency characteristics of a tire which rolls under a loaded condition against a testing drum, in three axis directions which are mutually normal. The reaction forces which are produced in that situation are generally identified as tangential, radial and lateral forces. Ascertaining fluctuations in radial force is an aspect of significance as such fluctuations have a considerable influence on the rolling chassis and handling characteristics of a motor vehicle.

When carrying out measuring runs for testing the uniformity of pneumatic tires, the tires are mounted on measuring rim members or on conventional disc wheels and rolled against a testing drum at high speeds of up to around 112 mph. In that connection, hitherto no account was taken of the fact that the measurement result for ascertaining the profile in respect of fluctuations in radial forces of the tire can also be affected by radial defects or flaws in respect of the testing drum.

SUMMARY OF THE INVENTION

An object of the present invention is therefore that of providing a process for testing the uniformity of pneumatic tires in which the detected profile in respect of fluctuations in radial forces of the tested tire is unaffected by radial rotational-truth defects and flaws of the testing drum.

Another object of the present invention is to provide a process for testing the uniformity of a pneumatic tire which is substantially independent of geometrical defects of the testing drum.

Still another object of the present invention is to provide a pneumatic tire uniformity testing process which is capable of providing more accurate testing results than hitherto by virtue of incorporating parameters of the testing drum into the operating procedure.

Yet another object of the present invention is to provide an apparatus for testing the uniformity of a pneumatic tire, which is operable to produce accurate test results by virtue of effecting compensation in respect of defects of the testing drum thereof.

The foregoing and other objects are attained in a first aspect by a process for testing the uniformity of a pneumatic tire in accordance with the principles of the present invention and in a further aspect by a pneumatic tire uniformity testing apparatus in accordance with the teachings of the invention.

The process and apparatus in accordance with the principles of this invention take account of geometrical defects and flaws in respect of the testing drum and in particular flaws in regard to rotational truth thereof. Various individual rotational truth profiles which are disposed in side-by-side relationship in the direction of the width of the testing drum, in juxtaposed radial planes of the testing drum which are normal to the axis thereof are taken to form the corresponding fluctuations in radial forces which result from geometrical defects and flaws of the testing drum, taking account of the ground pressure profile which is typical of the respective tire to be tested and which provides information about the spring stiffness of the tire at the contact patch thereof in a radial direction. Averaging the individual fluctuations in radial forces in the region of the axial extent of the tire contact patch or surface provides a correction radial force fluctuation which is dependent on the rotational angle of the testing drum and which is subtracted from the values, derived from the measuring arrangement in the measuring run, in respect of the fluctuation in radial force of the pneumatic tire.

For the purposes of determining the rotational truth defects of the testing drum, the fluctuations in radius on the testing drum are measured along a plurality of drum circumferences which are disposed in side-by-side relationship in the radial or vertical planes of the testing drum. Those fluctuations in radius then represent the individual rotational truth profiles in the radial planes of the testing drum, which are disposed in side-by-side relationship in the axial direction of the drum. The invention can thus provide for eliminating the resulting defects when determining the fluctuation in radial force of the tire.

Further objects, features and advantages of the present invention will be more clearly apparent from the following description of preferred embodiments of the invention.

DESCRIPTION OF PREFERRED EMBODIMENTS

Figure 1:
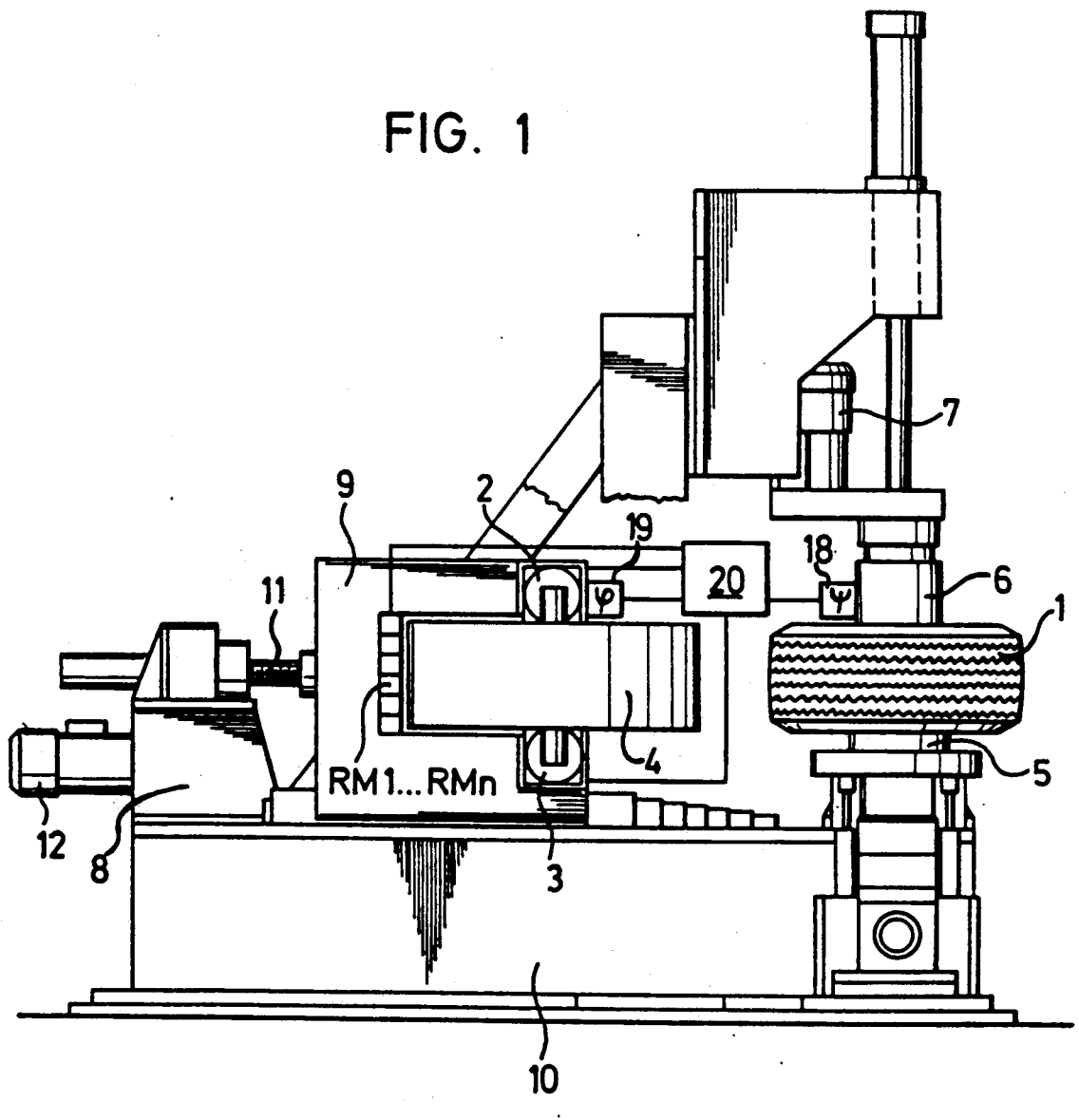
FIG. 1 is a diagrammatic view of an embodiment of a tire uniformity measuring machine in which the principles of the present invention can be employed.

Referring firstly to FIG. 1, shown therein is a tire uniformity measuring machine comprising a testing surface in the form of a rotary testing drum 4, which can also be referred to as a pressure wheel. Reference numeral 9 denotes a displaceable carriage in which the testing drum 4 is rotatably mounted. First and second measuring devices which are preferably in the form of measuring hubs as indicated at 2 and 3 in FIG. 1 are arranged at the axis of the testing drum 4, for detecting moments and forces to be measured in the course of a tire testing operation. The carriage 9 is displaceable in a horizontal direction on a bed structure 10 of the machine so that the testing drum 4 can be brought to bear and press against the surface of a tire 1 to be tested. For that purpose, the illustrated machine includes a wheel loading assembly 8 comprising a screw spindle 11 which can be driven in rotation by an electric motor 12 by way of a suitable transmission, for displacing the drum mounting carriage 9 and therewith the testing drum 4 in a horizontal direction towards the surface of the tire 1 to be tested. The wheel or tire loading may also be applied by another form of loading assembly such as a pneumatic or a hydraulic loading assembly.

The pneumatic tire 1 to be tested in the machine is mounted on a tire mounting system comprising first and second measuring rim halves 5 and 6. The measuring rim halves 5 and 6 are driven in rotation by a motor drive unit 7 for carrying out a tire measuring run. However the tire to be tested may also be mounted on a disc wheel and rotatably mounted in a suitable wheel mounting means in the machine for carrying out a tire measuring run.

Various forces can act on the tire 1 during a measuring run. The forces involved may be radial forces, lateral forces, tangential forces, camber moments and restoring moments. Those forces and moments can be appropriately detected by means of the two multi-component force measuring devices 2 and 3 which are disposed at the axis of the testing drum 4. Alternatively however the measuring devices may also be arranged in the machine on the side of the tire mounting arrangement. Suitable measuring devices are to be found for example in Hofmann Report 89, 09.84 from Gebr Hofmann GmbH & Co KG of Pfungstadt, Federal Republic of Germany.

Figure 2:
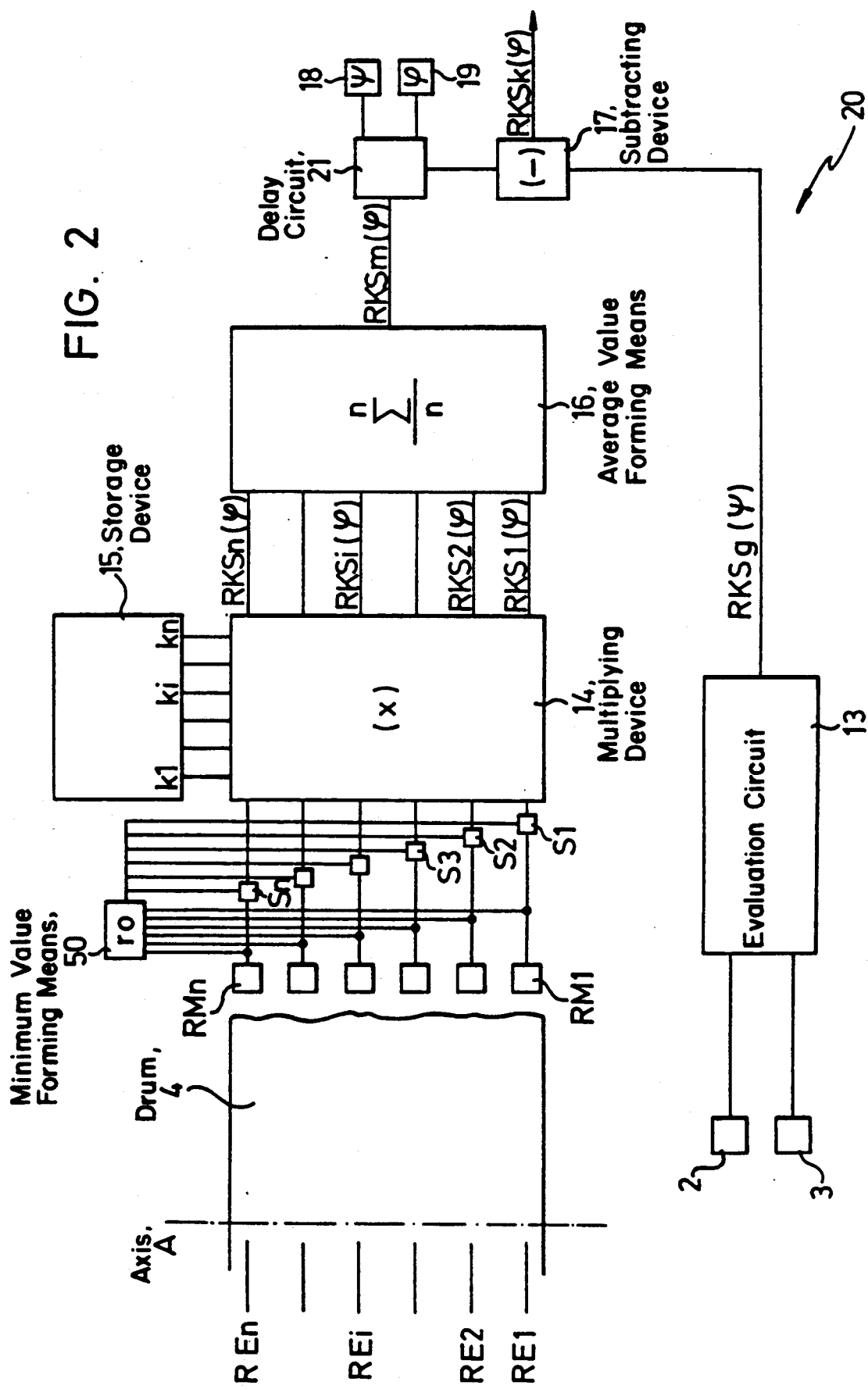
FIG. 2 is a view of a tire testing drum with exaggeratedly illustrated rotational truth defects, together with a block circuit diagram for a signal processing arrangement, in an embodiment in accordance with the principles of the present invention.

Reference will now be made to FIG. 2 showing a tire testing drum 4 with irregularity at its circumferential surface illustrated in exaggerated form.

In accordance with the teaching of the invention fluctuations in radial force which are detected by the measuring devices 2 and 3 are to be free from force fluctuation components which derive from irregularities of the circumferential surface of the testing drum 4.

For the purposes of detecting irregularities and unevenness at the peripheral surface of the testing drum, the arrangement has rotational truth profile measuring devices as indicated at RM1, RM2 . . . RMn in FIGS. 1 and 2. As shown in FIG. 1, the measuring devices may be mounted on the carriage 9 which carries the testing drum 4. In the illustrated construction, they are disposed in displaced relationship through 180° relative to the contact surface or patch with which the tire 1 to be tested bears against the testing drum 4, in other words, they are disposed in diametrally opposite relationship, with respect to the testing drum 4, in relation to the contact area between the testing drum 4 and the pneumatic tire 1.

During a measuring run, the measuring devices 2 and 3 output signals which are passed to a signal processing arrangement generally indicated at 20 in the block circuit diagram in FIG. 2. As will be described in greater detail hereinafter, the signal processing arrangement 20 also receives output signals from the rotational truth profile measuring devices RM1 . . . RMn. The arrangement also includes an angle sensor 18 for indicating the respective rotational angle $\psi$ of the tire 1 and an angle sensor 19 for indicating the respective rotational angle $\phi$ of the testing drum 4. As will also be described in greater detail hereinafter with reference to FIG. 2, the output signals from the sensors 18 and 19 are also passed to the signal processing arrangement 20.

In the measuring run the measuring devices 2 and 3 measure the fluctuations in radial force in the region of the contact surface or patch with which the tire 1 to be tested bears against the circumferential surface of the testing drum 4. An evaluation circuit indicated at 13 in FIGS. 2 and 7 and which is connected to the measuring device 2 and 3 in the signal processing arrangement 20 delivers a corresponding radial force fluctuation signal RKSg ($\psi$) which is dependent on the rotational angle $\psi$ of the tire 1. The measuring devices 2 and 3 are known, as indicated above, together also with the evaluation circuit 13, see for example Hofmann News 3.

As the exaggerated view in FIG. 2 shows, the circumferential surface of the testing drum 4 against which the tire 1 to be tested bears is of an irregular or non-uniform configuration, more specifically, in different radial planes indicated at RE1 . . . REn of the testing drum 4, and in respect of different cross-sections in those radial planes which are normal to the drum axis as indicated at A, the testing drum 4 has different radii along the corresponding circumferences.

For the purposes of detecting individual rotational truth profiles in the radial planes of the testing drum 4 which are normal to the drum axis A, the apparatus includes rotational truth profile measuring devices RM1, RM2 . . . RMn. The rotational truth profile measuring devices are arranged in a line in the direction of the width of the testing drum 4, that is to say, in a line parallel to the drum axis A. The rotational truth profile measuring devices detect individual rotational truth profiles by measurements in respect of the radii r1 ($\phi$), r2 ($\phi$), Rn ($\phi$). The rotational truth profiles vary with an angular position $\phi$ which corresponds to a given circumferential position in respect of the drum. The angle-dependent signals which correspond to the rotational truth profiles r1 ($\phi$) . . . rn ($\phi$) alter with the rotational angle of the testing drum. The rotational truth profiles reproduce the fluctuations in radii of the circumferences of the drum in the radial planes RE1 . . . REn of the testing drum 4, which, as mentioned, are normal to the drum axis A. The above-indicated circumferences of the drum are disposed in side-by-side relationship in the widthwise direction of the drum 4, that is to say, in the axial direction thereof.

The output signals of the measuring devices RM1 to RMn, which correspond to the radii r1 ($\phi$) . . . rn ($\phi$) are used to ascertain the minimum radius ro in a minimum value forming means indicated at 50 in FIG. 2, and for each of the radial planes RE1 ... REn the values of Δr1 (φ) ... Δrn (φ) are formed in subtracting units S1, S2 ... Sn, in accordance with the relationship Δri (φ)=ri (φ)−ro, wherein i=1, 2 ... n. The signals corresponding to the values of Δr1 (φ) ... Δrn (φ) are applied to a multiplying device 14. A storage device 15 is also connected to the multiplying device 14 for storing numerical values in respect of individual levels of radial spring stiffness k1, k2 ... kn of the pneumatic tire 1 to be tested. Those numerical values are obtained from the typical ground pressure distribution profile of the tire 1 to be tested. The radial spring stiffness k of the tire is ascertained by imparting a radial travel X to the tire and measuring the associated radial force F. The spring stiffness parameter k is then obtained by applying the relationship k=F/X.

Figure 3:
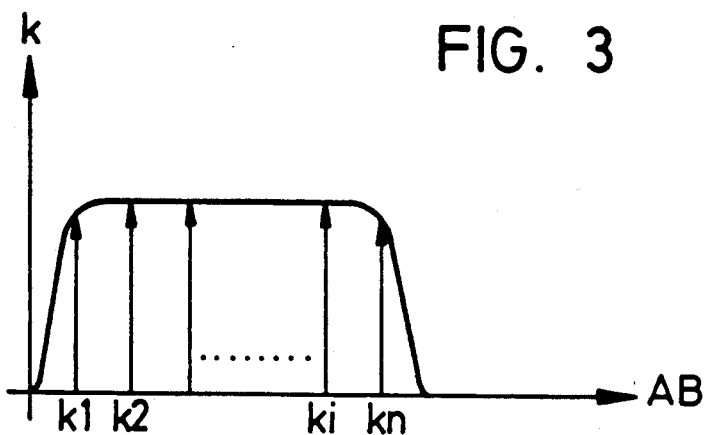
FIG. 3 shows a ground pressure distribution profile of a pneumatic tire.

Reference will now be made to FIG. 3 showing a typical ground pressure distribution profile of a pneumatic tire. In this case the force k is plotted against the axial width AB of the contact surface or patch of the tire. The individual spring stiffness values k1 ... kn are specified for the same radial planes RE1 ... REn of the testing drum 4, in which the individual rotational truth profiles r1 (φ) ... rn (φ) were measured, for the pneumatic tire 1 which is being pressed against and is to be tested by the testing drum 4. At its output the storage device 15 supplies signals corresponding to the individual spring stiffness values k1 ... kn, to the multiplying device 14.

In the multiplying device 14 shown in FIG. 2 the respective fluctuations in radius Δr1 (φ) ... Δrn (φ) are multiplied by the individual spring stiffness values k1 ... kn. In that operation, n different multiplication steps are performed. That therefore results in the formation of fluctuations in radial force RKS1 (φ), RKS2 (φ) ... RKSn (φ), for the individual radial planes RE1, REn. Those fluctuations in radial force represent, in respect of the measured radial force fluctuation signal, correction factors which are derived in dependence on the radii Δr1 (φ) ... Δrn (φ) of the individual rotational truth profiles of the testing drum 4 in the respective radial planes RE1 ... REn.

The output signals in respect of the individual radial force fluctuations RKS1 (φ) ... RKSn (φ), which signals are supplied by the multiplying device 14, are passed to an average value forming means 16 in which the sum of the individual radial force fluctuation signals RKS1 (φ) ... RKSn (φ), is divided by the number n of those signals. At its output the means thus supplies an averaged radial force fluctuation signal RKSm (φ) representing the correction value which was derived from the individual rotational truth profiles in the radial planes RE1 ... REn of the testing drum 4. That signal represents the correction radial force fluctuation which is dependent on the rotational angle φ of the drum.

For that purpose the average value forming means 16 carries out a computation operation in accordance with the following relationship:

$$RSKm(\phi) = \frac{\sum_{i=1}^{n} RKSi(\phi)}{n}$$

in respect of the instantaneous rotational angle φ of the drum.

As FIG. 2 shows, the output signal of the evaluation circuit 13 which is the measured radial force fluctuation signal RKSg (ψ) dependent on the rotational angle ψ of the tire 1, and the output signal of the average value forming means 16 which supplies the correction value RKSm (φ) which is dependent on the rotational angle φ of the drum, are passed to a subtracting device 17 in which the correction value RKSm (φ) is subtracted from the measured radial force fluctuation signal RKSg (ψ). At the output side the subtracting device 17 produces a signal corresponding to the corrected radial force fluctuation. That radial force fluctuation is free from the influences governed by radial or rotational truth defects of the testing drum 1. That corrected radial force fluctuation signal is identified by RKSk (ψ).

Figure 4A:
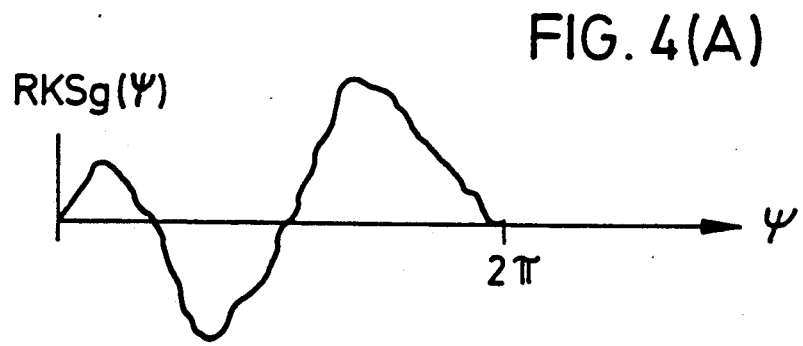
FIG. 4(A) illustrates a curve in respect of a measured fluctuation in radial force during a revolution of a tire.
Figure 4B:
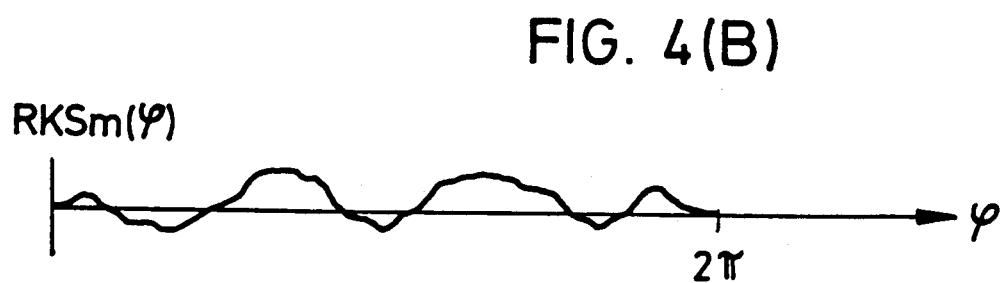
FIG. 4(B) shows a curve in respect of a detected correction radial force fluctuation during a revolution of the drum.

In many situations it will happen that the diameter of the tire 1 to be tested is not the same as the diameter of the testing drum 4. The testing drum 4 and the tire 1 to be tested will therefore finish a respective full revolution, at different moments in time. That will result in radial force fluctuation signals of different lengths, for respective full revolutions of the testing drum 4 and the pneumatic tire 1 to be tested respectively. Reference will therefore now be made to FIG. 4(A) showing, in respect of a revolution of the tire 1 to be tested, a radial force fluctuation signal RKSg (ψ) which is dependent on the rotational angle ψ of the tire 1 and which was measured for one revolution of the tire. FIG. 4(B) shows, in respect of one revolution of the testing drum 4, a signal produced for correction of the radial force fluctuation RKSm (φ) which is dependent on the rotational angle φ of the testing drum. In successive revolutions of the testing drum 4 and the pneumatic tire 1 to be tested, different surface regions of the tire 1 and the testing drum 4 meet each other in succession at the contact surface or patch.

If for reasons related to design configuration it is not possible for the rotational truth profile measuring devices RM1 ... RMn for sensing the surface of the drum to be arranged at the angular position at which the tire 1 is pressed against the surface of the drum 4 at the appropriate contact surface or patch, the measuring devices RM1 ... RMn are disposed at a different position therefrom, for example in diametrally opposite relationship, as shown in the FIG. 1 structure. During the measuring run therefore the contact surface or patch and the position at which the rotational truth profile measuring devices RM1 ... RMn are arranged are at an angular spacing of 180° relative to each other, in regard to the rotational angle φ of the drum 4. However the tire uniformity measuring machine may also use other angular spacings, for example an angular spacing of 90° or preferably an acute angular spacing in order to carry out the rotational truth profile measuring operations as closely as possible to the contact surface or patch.

In the operation of subtracting the correction force fluctuation which was obtained during the measuring run and which is formed from the signals obtained from the rotational truth profile measuring devices RM1 ... RMn, from the measurement signal supplied by the evaluation circuit 13 for the measured radial force fluctuations RKSg (ψ), it is then necessary to take account of the angular spacing between the rotational truth profile measuring devices RM1 ... RMn and the contact surface with which the tire 1 bears against the testing drum 4. Preferably, with respect to the direction of rotation of the testing drum 4, the rotational truth profile measuring devices RM1 ... RMn will be disposed at an angular position or in an axial plane passing through the drum axis A, which is disposed upstream of the contact surface or patch as the surface of the testing drum may experience alterations therein in the region of the contact surface, during the measuring run, for example due to the tire profile wearing away during the testing operation. As the rotational truth profile measuring devices are disposed upstream of the contact surface or patch as considered in the direction of rotation of the testing drum, the arrangement provides for sensing of the respective surface structure of the testing drum which subsequently goes into the contact surface or patch. It is therefore necessary for the signals from the rotational truth profile measuring devices, for respective surface regions at the various rotational angles of the drum, to be associated with the radial force fluctuation signals which are measured when the respective surface regions of the drum are in the contact surface or patch.

Figure 5:
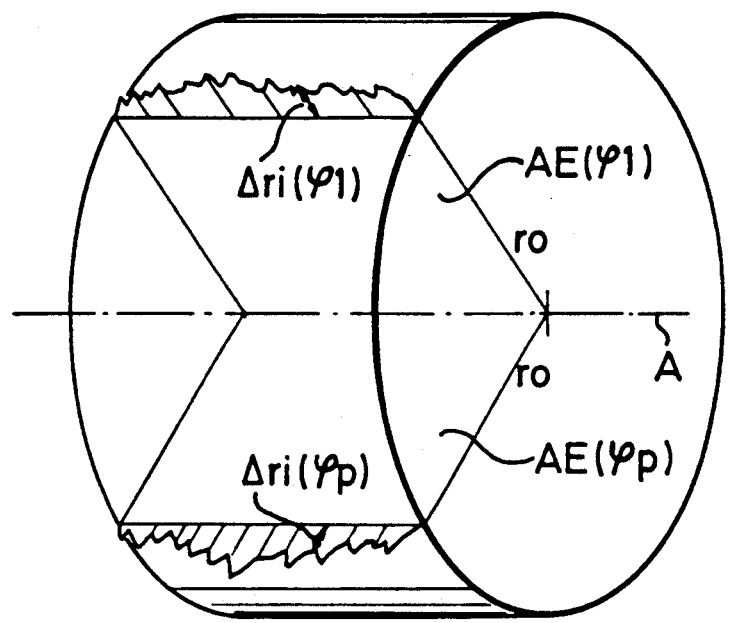
FIG. 5 is a perspective diagrammatic view of a testing drum with axial surface profiles.

So that the fluctuations in radius which are measured by the rotational truth profile measuring devices RM1 . . . RMn, in successive axial planes AE ($\phi$)1 . . . AE ($\phi$)p, as shown in FIG. 5, which later go into the position of the contact surface or patch, are associated with the correct values in respect of the measured radial force fluctuation, the correction radial force fluctuation signal RKSm ($\phi$) is applied to the measured radial force fluctuation signal RKSg ($\psi$), by way of a delay circuit 21 which may be for example in the form of a shift register, for the subtraction step in the subtracting device 17. For that purpose the delay circuit 21 may be controlled by the angle sensors 18 and 19 which indicate the respective rotational angles $\psi$ and $\phi$ of the pneumatic tire 1 and the testing drum 4 respectively. It will be appreciated in that respect that the difference between the radius of the testing drum 4 and the radius of the pneumatic tire 1 is also taken into consideration. That ensures that the respective radius fluctuation signals, which are dependent on the rotational angle of the drum, for the corresponding surface regions of the drum 4, are properly associated with the radial force fluctuations which occur when those surface regions pass into the contact surface between the drum 4 and the tire 1, thereby providing for accurate association between the correction values and the measured signals which have to be corrected.

The delayed action of the correction signal on the measured signal, with the delay being produced by the above-mentioned delay circuit 21, can also be controlled by adjusting the delay time in consideration of the angular spacing of the position of the contact surface or patch and the position of the axial plane in which the rotational truth profile measuring devices RM1 . . . RMn are disposed, as well as the speed of rotation which is used in the measuring run.

Figure 6:
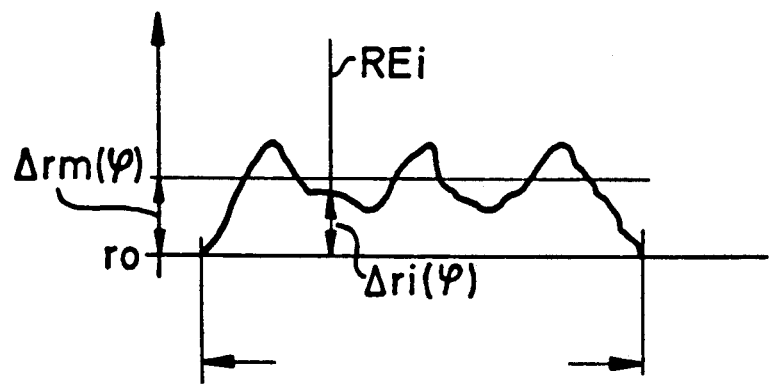
FIG. 6 shows a curve in respect of a surface profile in an axial direction or in an axial plane of the testing drum.
Figure 7:
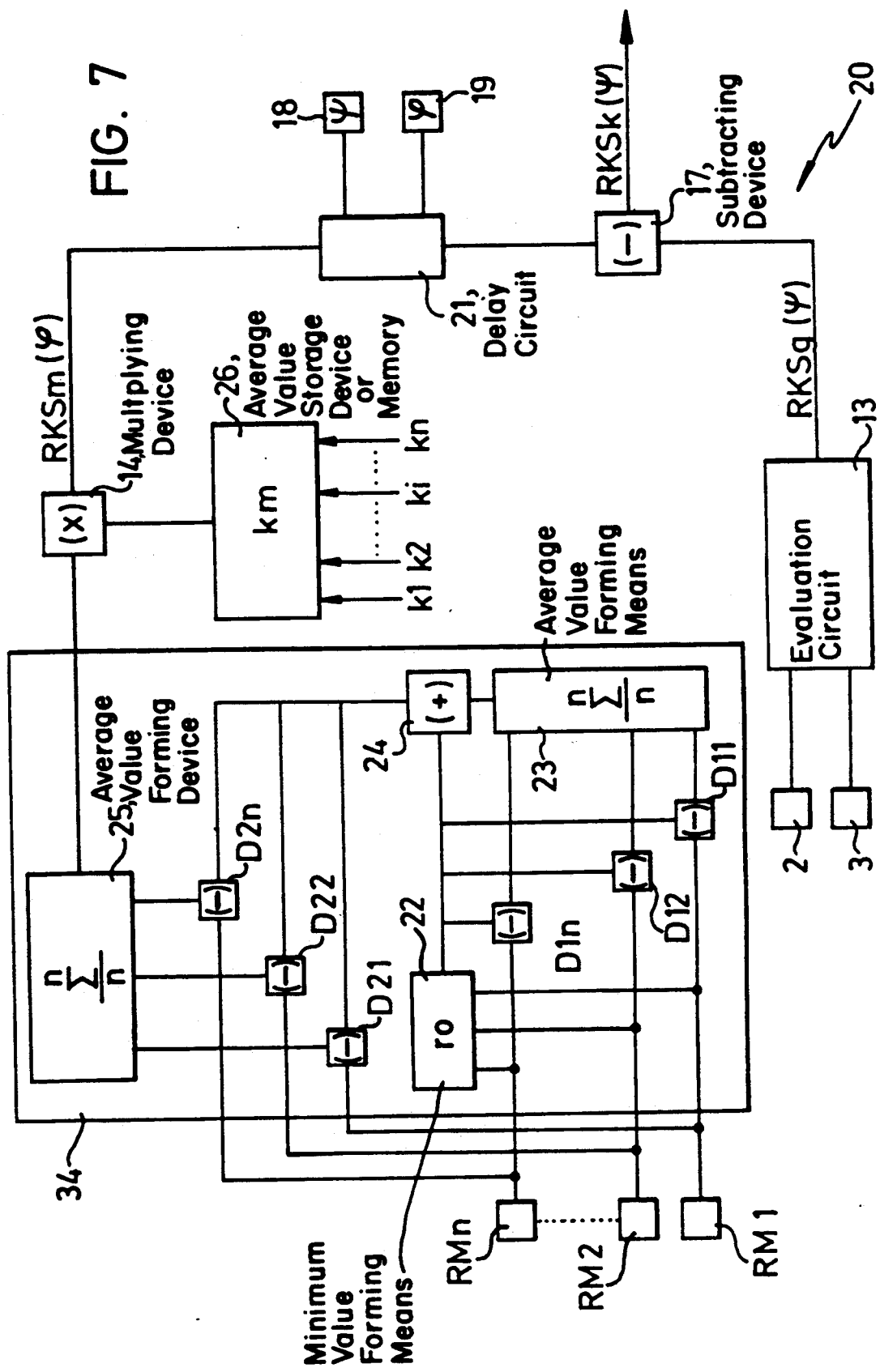
FIG. 7 shows a further embodiment of a signal processing arrangement.

Reference will now be made to FIGS. 5 through 7 for the description of a further embodiment of the invention. For that purpose, the same reference numerals are used in the block circuit diagram of the embodiment illustrated in FIG. 7, to identify components which produce the same actions and effects, as in the embodiment described above with reference to FIG. 2.

In this embodiment, the individual radial force fluctuations which are obtained from the rotational truth profiles in the various radial planes and which are dependent on the rotational angle $\phi$ of the testing drum 4 are averaged over the axial extent of the contact surface or patch, and that average value is used as a correction radial force fluctuation which is dependent on the rotational angle of the drum.

For that purpose the fluctuations in radii are ascertained in the radial planes RE1 . . . REn, for the respective rotational angles $\phi$ of the drum 4. The various radii ri ($\phi$) are first ascertained in the n radial planes RE1 . . . REn, wherein i=1 . . . n, for an axial plane AE ($\phi$) which is disposed at respective rotational angles $\phi$ of the drum and which passes through the drum axis A. Those n radii in respect of the irregularities of the circumferential surface of the drum are used to form the minimum radius ro. FIG. 5 diagrammatically shows, in respect of a rotational angle $\phi$1 of the drum and the associated axial plane AE ($\phi$1), and any rotational angle $\phi$p of the drum and the associated axial plane AE ($\phi$p) profiles in those two axial planes.

As shown in FIG. 7, for that purpose, the smallest radii ro ($\phi$) are formed in a minimum value forming means 22 continuously from the output signals from the rotational truth profile measuring devices RM1 . . . RMn, for the respective axial planes, and the minimum radius ro for all axial planes is then formed from those values.

For the purposes of ascertaining the fluctuations of radii in the respective axial planes, the procedure also involves forming the difference $\Delta$ri ($\phi$)=ri ($\phi$)−ro. That operation is carried out in the difference forming means D11, D12 . . . D1n. The differences $\Delta$ri ($\phi$) produced in that way are used in an average value forming means 23 to form thereof the average value as follows:

$$\Delta rm(\phi) = \frac{\sum_{i=1}^{n} \Delta ri(\phi)}{n}$$

Reference is now made to FIG. 6 showing an individual profile in respect of the irregularities of the surface of the drum in an axial plane which is associated with a given rotational angle $\phi$. The average value $\Delta$rm ($\phi$) forms the average of the deviations from the minimum radius ro. That value is plotted in FIG. 6 as a straight line, over the width of the drum.

For the purposes of ascertaining the fluctuations in radii about that average value, an adding device 24 is first operable to form the sum (ro+$\Delta$rm ($\phi$)). That sum is used to form the corresponding differences, for determining the fluctuations in radius, in difference forming devices D21, D22 . . . D2n, to which the output signals of the rotational truth profile measuring devices RM1 . . . RMn are respectively supplied. The fluctuations in radius $\delta$ri ($\phi$)=ri ($\phi$)−(ro+$\Delta$rm ($\phi$)) are therefore produced in the difference forming means D21 . . . D2n, wherein i=1 . . . n. The output signals from the difference forming devices D21 . . . D2n are passed to an average value forming means 25 which forms the average fluctuation $\delta$rm ($\phi$) of the profile in a respective axial plane AE ($\phi$) for the respective rotational angles $\phi$ of the drum, in accordance with the following relationship:

$$\delta rm(\phi) = \frac{\sum_{i=1}^{n} \delta ri(\phi)}{n}$$

That average which is produced in a suitable device at indicated at 34 in FIG. 7 is multiplied by an average spring stiffness in the axial plane, that is to say, over the axial extent of the contact surface or patch. That average value in respect of spring stiffness of the tire is derived by averaging from the typical ground pressure distribution profile of the respective tire 1 to be tested, as illustrated in FIG. 3. That average is put into a memory 26 in the embodiment shown in FIG. 7, and can be derived from the individual spring stiffness values k1 .. . kn for the axial extent of the contact surface or patch. The multiplying device 14 effects multiplication of the average value formed in the average value forming device 25, by the average spring stiffness contained in the average value storage device or memory 26.

As in the embodiment illustrated in FIG. 2, the output signal RKSm ($\phi$) of the multiplying device 14 forms the correction value which is derived from the irregularities or unevenness of the drum and which is represented as the correction radial force fluctuation which is dependent on the rotational angle $\phi$ of the testing drum 4. As in the embodiment shown in FIG. 2, that output signal is applied to the subtracting device 17 by way of the delay stage 21. In the same manner as in the FIG. 2 construction, the subtracting device 17 then effects subtraction from the output signal of the evaluation circuit 13 which reproduces the measured radial force fluctuation RKSg ($\psi$) which is dependent on the rotational angle $\psi$ of the tire 1 to be tested. The subtracting device 17 then supplies the radial force fluctuation signal RKSk ($\psi$) from which the rotational truth defect of the testing drum 4 has been removed.

Figure 8:
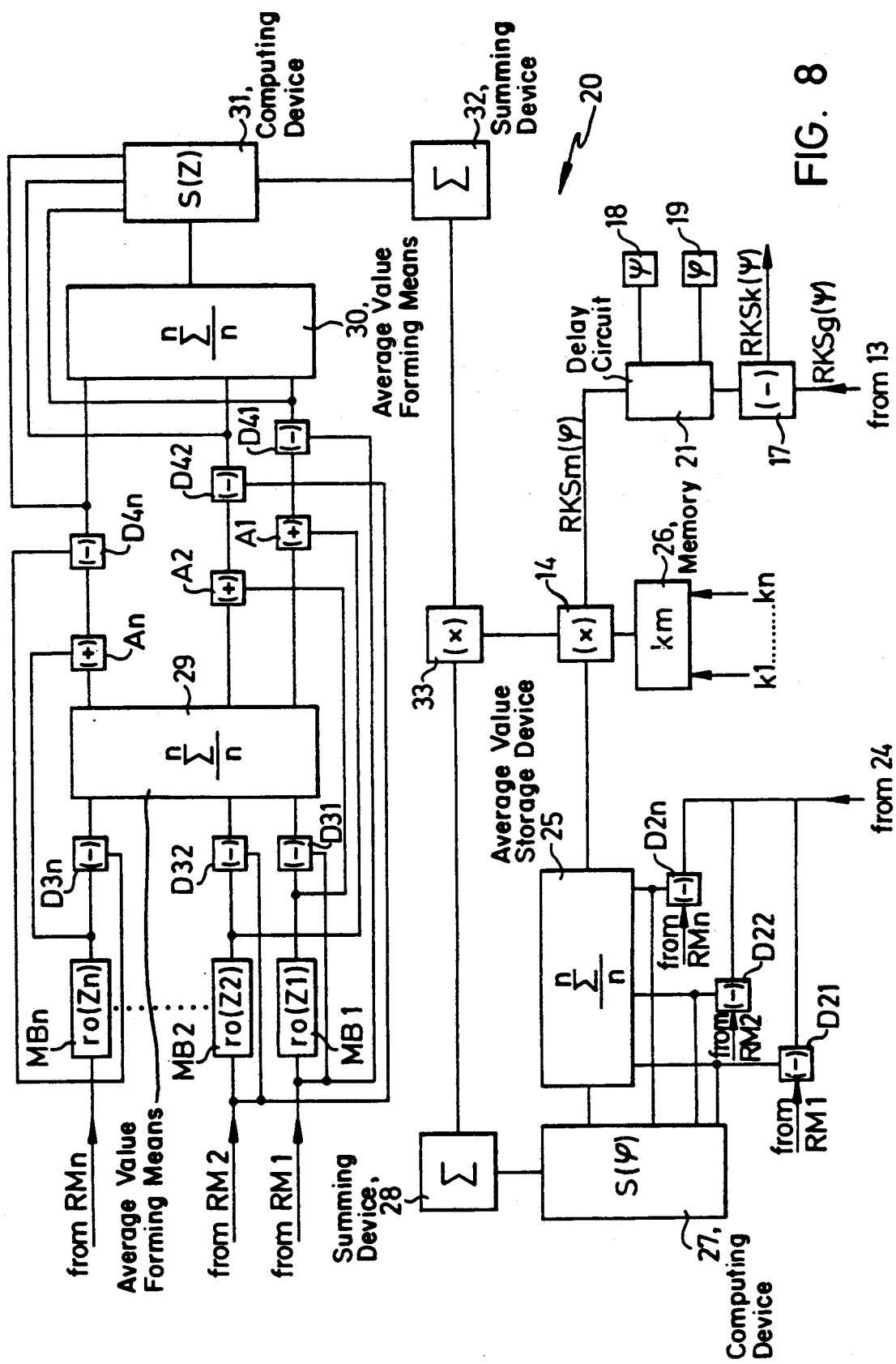
FIG. 8 shows an expanded form of the signal processing arrangement shown in FIG. 7.

Referring now to FIG. 8, the construction illustrated therein, besides the components of the construction shown in FIG. 7, also has additional circuit devices for taking account of the waviness or ripple of the respective profiles in the axial planes and the waviness or ripples in the profiles of the axial planes, when forming the required correction value.

For that purpose, the circuit arrangement illustrated in FIG. 7 is further supplemented by additional circuit components in the manner illustrated in FIG. 8. The FIG. 8 circuitry includes a computing means 27 for forming the standard deviation S ($\phi$) of the fluctuations of the profile geometry of a respective axial plane AE ($\phi$). That standard deviation is also a measurement in respect of the waviness or ripple of the respective surface profile in an axial plane of the testing drum 4. For ascertaining the standard deviation S ($\phi$), the computing device 27 performs the following computation:

$$S(\phi) = \sqrt{\frac{\sum_{i=1}^{n} [Sri(\phi) - Srim(\phi)]^2}{n-1}}$$

For that purpose the computing device 27 receives the output signals of the average value forming means 25 and the difference forming means D21, D22 ... D2n which are also components of the FIG. 7 construction. The output signal from the computing device 27 is passed to a summing device 28 which computes an axial shape factor $\alpha(\phi)$ in accordance with the following relationship:

$$\alpha(\phi) = 1 + a o S(\phi)$$

In that relationship the factor $ao$ gives the reaction of the tire 1 to be tested to the waviness or ripple of the drum profile in the respective axial plane AE. For example, with a very high degree of waviness which is specified by the value S ($\phi$), that is to say, with a high value in respect of S ($\phi$), the behaviour and characteristics of the tire are such that it behaves like an elastic plate in the region of the contact surface or patch and averages out the roughness which is caused by the high degree of waviness or ripple, that is to say, the factor $ao$ is then low.

With a low degree of waviness, in other words when the value of S ($\phi$) is low, the surface profile of the testing drum produces a deformation effect in the surface region of the tire which is at the contact surface or patch, and thus a fluctuation in radial force. The summing operation which is effected in the summing device 28 as described above ensures that, with a value of S ($\phi$) tending towards zero, but with the existence of a fluctuation in radius $\delta ri$ ($\phi$), the effect of that fluctuation in radius does not tend towards zero. The summing operation therefore ensures that the effect of the fluctuation in radius is still taken into account when ascertaining the correction value.

In addition, in the FIG. 8 structure, account is taken of a radial shape factor $\beta(z)$ which is a measurement in respect of the reaction of the tire to different degrees of waviness in the rotational truth profiles which are in side-by-side relationship in the direction of the axis of the drum, that is to say in the z-direction, in the radial planes RE1 ... REn. For that purpose, the minimum radii Ro (zl) ... Ro (Zn) are ascertained in the n radial planes, in respect of the respective rotational truth profiles. That is effected by the output signals of the rotational truth profile measuring devices RM1 ... RMn being supplied to minimum value forming devices MB1 ... MBn. The output signals from the minimum value forming devices MB1 ... MBn and the output signals from the rotational truth profile measuring devices RM1 ... RMn are passed to difference forming means D31, D32 ... D3n. They form the difference $\Delta ri$ (zi) = ri ($\phi$) − ro (zi), wherein i = 1 ... n. An average value forming means 29 is then operable to form the average value $\Delta rm$ (z) in accordance with the following relationship:

$$\Delta rm(z) = \frac{\sum_{i=1}^{n} \Delta ri(zi)}{n}$$

For the purposes of ascertaining the fluctuation in radius of the rotational truth profiles in the respective radial planes of the testing drum 4, the sums ro (zi) + $\Delta rm$ (z) are firstly formed in adding devices A1, A2 ... An, wherein i = 1 ... n. For that purpose the adding devices A1, A2 ... An receive the output signals from the minimum value forming means MB1, MB2 ... MBn and the average value forming means 29.

The fluctuations in radius $\delta r$ (zi) of the rotational truth profiles in the n radial planes of the testing drum 4 are produced in accordance with the following relationship:

$$\delta ri(zi) = ri(\phi) - (ro(zi) + \Delta rm(z))$$

For that purpose the difference forming means D41, D42 ... D4n receive the output signals from the adding devices A1, A2 ... An and the rotational truth profile measuring devices RM1, RM2 ... RMn.

In an average value forming means 30, those fluctuations in radius about the mean fluctuation δrm (z) are used to form the following relationship:

$$\delta rm(z) = \frac{\sum_{i=1}^{n} \delta ri(z)}{n}$$

In order to take account of the fluctuations in geometry of the profile in the radial plane z, the standard deviation S (z), over the circumference in the respective radial plane, is formed in accordance with the following relationship:

$$S(z) = \sqrt{\frac{\sum_{i=1}^{n} [\delta ri(zi) - \delta rm(z)]^2}{n-1}}$$

For that purpose a computing circuit 31 receives the output signals from the difference forming devices D41, D42 ... D4n and the average value forming device 30. The radial shape factor β is produced in accordance with the relationship $\beta = 1 + \beta o S(z)$. For the purposes of carrying out that summing operation, a summing device 32 is connected to the output of the computing device 31. In this case also βo indicates the reaction of the tire 1 to different levels of waviness in the corresponding radial plane. With a great degree of waviness the tire 1 does not react because the tire in its contact surface or patch bears against the peaks of the up and down configuration defined by the waviness. S (z) is then large and small and βo is of a low value. With a low level of waviness, that is to say with a value tending towards zero in respect of S (z), a travel movement is imparted to the tire and thus a radial force fluctuation is formed by the irregularity of the drum. The tire accordingly reacts to that drum irregularity. That can be taken into account by suitable selection in respect of βo.

The two output signals of the summing devices 28 and 32 are applied to a multiplying device 33. A signal which corresponds to the product $a(\phi) \times \beta(z)$ formed in the multiplying device 33 is applied to the multiplying device 14 in which then the following multiplication operation is carried out to form the correction radial force fluctuation RKSm (φ):

$$RKSm(\phi) = km \times \delta rm(\phi) \times a(\phi) \times \beta(z)$$

That correction signal is then subjected to further processing in the same manner as in the embodiments shown in FIGS. 2 and 7.

The storage device 15 may be connected to an input device (not shown) for inputting the numerical values in respect of the individual levels of spring stiffness k1 ... kn which are obtained from the ground pressure distribution profile of the tire 1 to be tested, as shown in FIG. 3.

It will be appreciated that, in the operation of forming the correction value RKSm (φ), it is only necessary, in the axial widthwise region of the testing drum 4 over which the contact surface or patch of the pneumatic tire 1 extends, to ascertain the individual rotational truth profiles in the radial planes of the testing drum 4, in a number thereof which lie in that widthwise region of the contact surface or patch. Therefore, depending on the width of the tire, different numbers of rotational truth profiles will be ascertained, and used for forming the correction value in respect of the measured radial force fluctuation, by an averaging operation.

The radius measuring devices RM1 ... RMn may be in the form of contact-less sensing devices or they may be measuring devices which mechanically sense the surface of the drum.

Accordingly the present invention provides a process and an apparatus for testing the uniformity of pneumatic tires such as vehicle tires, comprising subtracting from the measured radial force fluctuation a correction value which is derived from individual rotational truth profiles in respect of the testing drum, in radial planes which are normal to the axis of the drum.

It will be appreciated that the above-described embodiments have been set forth solely by way of example and illustration of the principles of the present invention and that various other modifications and alterations may be made therein without thereby departing from the spirit and scope of the invention.

I claim:

1. Apparatus for testing the uniformity of a pneumatic tire comprising:
   a testing drum against which a tire to be tested rolls in contact with the testing drum at a contact surface;
   a measuring means for measuring radial force fluctuations which occur in the rolling operation at the contact surface and producing measurement signals;
   an evaluation means for forming a value which reproduces the radial force fluctuations from the measurement signals from the measuring means;
   a plurality of rotational truth profile measuring means arranged along the axial width of the testing drum for determining individual rotational truth profiles along a plurality of drum circumferences in juxtaposed radial planes of the testing drum, said profile measuring means being adapted to output rotational truth fluctuation signals corresponding to the respective individual rotational truth profiles;
   a storage means for storing an average spring stiffness value derived from a ground pressure profile which is typical of the tire to be tested, over the axial width of the contact surface;
   a means for forming the average value of the deviations in respect of radius from an average radius in an axial plane of the testing drum;
   means connecting the rotational truth profile measuring means to said means for forming said average value;
   a multiplication means and means connecting the means for forming said average value and said storage means for the average spring stiffness value to said multiplication means which is thereby adapted to multiply the average spring stiffness of the tire at the contact surface by the average value of the deviations in respect of radius in a respective axial plane of the testing drum, to form a product corresponding to the correction force fluctuation; and
   a subtracting means and means connecting the outputs of the multiplication means and the evaluation means to the subtracting means.

2. A method for testing the uniformity of a pneumatic tire comprising the steps of:
   in a measuring run, rolling a pneumatic tire mounted on a mounting ring means against a testing drum with a given radial loading thereagainst;

measuring radial force fluctuations which occur during said rolling to produce corresponding measurement signals;

evaluating the measurement signals to generate values corresponding to the radial force fluctuations;

measuring individual rotational truth profiles on the testing drum along a plurality of drum circumferences which are disposed in a juxtaposed relationship in radial planes of the testing drum at least over the axial width of a contact surface with which the pneumatic tire bears against the testing drum;

creating correcting radial force fluctuations which vary with the rotational angle of the testing drum, the correcting radial force fluctuations being created from fluctuations in radius of the rotational truth profiles in said radial planes and from a ground pressure profile which is typical of the pneumatic tire being tested over the axial width of the contact surface, the correcting radial force fluctuations indicating the proportion of the measured radial force fluctuations which result from unevenness of the circumferential surface of the testing drum; and subtracting the correcting radial force fluctuations from the radial force fluctuation values generated from the measurement signals produced for the pneumatic tire being tested.

3. The method of claim 2 wherein said subtracting of the correcting radial force fluctuations is effected in a time-shifted manner in dependence on the angular spacing of the contact surface of the pneumatic tire against the testing drum to the axial plane of the testing drum in which the rotational truth profiles of the testing drum are sensed, and the speed of rotation used in the measuring run.

4. The method of claim 2 including detecting the fluctuations in radius of the rotational truth profiles by measurement of the radii which are dependent on the rotational angle of the drum, in the respective radial planes.

5. The method of claim 2 including detecting deviations in radius from mean radii in the respective axial planes in dependence on the rotational angle of the drum in the axial planes.

6. The method of claim 2 further comprising:

forming individual radial spring stiffness values for the pneumatic tire from the ground pressure distribution profile, for the radial planes in which the rotational truth profiles of the testing drum are measured, over the axial width of the contact surface;

forming, from the fluctuations in radius of the rotational truth profiles and the individual spring stiffness values formed in the respective same radial planes, individual radial force fluctuations which are dependent on the rotational angle of the drum; and forming from said individual radial force fluctuations the average value over the axial width of the contact surface in the form of a correcting radial force fluctuation.

7. The method of claim 2 comprising forming in dependence on the rotational angle of the drum, for the axial width of the contact surface, the average deviations in respect of radius from average radii in the respective axial planes, and multiplying same by an average spring stiffness value derived from the ground pressure profile, to determine the correcting radial force fluctuations.

8. The method of claim 7 wherein the fluctuations in the deviations in respect of radius from the average radii in the respective axial planes of the testing drum are used to determine the radial force fluctuation reaction of the pneumatic tire for the respective axial plane of the testing drum by means of an axial shape factor which is dependent on the nature of the tire to be tested, and same is multiplied by the product of the average deviation in respect of radius and the average spring stiffness of the tire.

9. The method of claim 7 wherein a radial shape factor which is dependent on the nature of the tire to be tested is formed as an average value in respect of radial individual shape factors in the radial planes, from the fluctuations in the deviations in respect of radius in the respective radial planes of the testing drum within the axial width of the contact surface, and same is multiplied by the respective product obtained from the deviation in respect of radius and the average spring stiffness.

10. The method of claim 8 wherein a radial shape factor which is dependent on the nature of the tire to be tested is formed as an average value in respect of radial individual shape factors in the radial planes, from the fluctuations in the deviations in respect of radius from an average radius in the respective radial planes of the testing drum within the axial width of the contact surface, and same is multiplied by the respective product obtained from the deviation in respect of radius, the average spring stiffness and said axial factor.

11. Apparatus for testing the uniformity of a pneumatic tire comprising:

a testing drum against which a tire to be tested rolls in contact with the testing drum at a contact surface;

a measuring means for measuring radial force fluctuations which occur in the rolling operation at the contact surface and producing measurement signals;

an evaluation means for forming a value which reproduces the radial force fluctuations from the measurement signals from the measuring means;

a plurality of rotational truth profile measuring means arranged along the axial width of the testing drum for determining individual rotational truth profiles along a plurality of drum circumferences in juxtaposed radial planes of the testing drum, said profile measuring means being adapted to output rotational truth fluctuation signals corresponding to the respective individual rotational truth profiles;

a storage means for storing individual spring stiffness values, derived from a ground pressure profile which is typical for the tire to be tested, in the radial planes in which the detected individual rotational truth profiles of the testing drum are disposed;

a multiplication means and means connecting the outputs of the rotational truth profile measuring means and the output of the storage means to the multiplication means, the multiplication means being adapted by multiplication of the individual spring stiffness values with the respective rotational truth profiles to form the corresponding individual radial force fluctuations for the radial planes;

an average value forming means connected to the multiplication means for forming from the individual radial force fluctuations a correction radial force fluctuation signal which is averaged over the axial width of the tire-testing drum contact surface; and a subtracting means and means connecting the outputs of the evaluation means and the average value forming means to the subtracting means.

* * * * *

UNITED STATES PATENT AND TRADEMARK OFFICE
CERTIFICATE OF CORRECTION

PATENT NO. : 5,027,649

DATED : July 2, 1991

INVENTOR(S) : Gunther Himmler

It is certified that error appears in the above-identified patent and that said Letters Patent is hereby corrected as shown below:

On the title page: Item

[73] Assignee: Gebr. Hofmann GmbH & Co.KG Maschinenfabrik Pfungstadt, Fed.Rep. of Germany Signed and Sealed this Twenty-ninth Day of December, 1992

Attest:

DOUGLAS B. COMER

*Attesting Officer*　　　*Acting Commissioner of Patents and Trademarks*